US008654927B2

(12) United States Patent
Pietig

(10) Patent No.: US 8,654,927 B2
(45) Date of Patent: Feb. 18, 2014

(54) ELECTRON COLLECTING ELEMENT WITH INCREASED THERMAL LOADABILITY, X-RAY GENERATING DEVICE AND X-RAY SYSTEM

(75) Inventor: Rainer Pietig, Malsch (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/502,540

(22) PCT Filed: Oct. 18, 2010

(86) PCT No.: PCT/IB2010/054710

§ 371 (c)(1), (2), (4) Date: Apr. 18, 2012

(87) PCT Pub. No.: WO2011/051855

PCT Pub. Date: May 5, 2011

(65) Prior Publication Data

US 2012/0213325 A1 Aug. 23, 2012

(30) Foreign Application Priority Data

Oct. 27, 2009 (EP) .................................... 09174185

(51) Int. Cl.
*H01J 35/12* (2006.01)
*G01N 23/04* (2006.01)

(52) U.S. Cl.
USPC .................. 378/143; 378/4; 378/142; 378/62

(58) Field of Classification Search
USPC .......................... 378/125, 143, 113, 119, 126
See application file for complete search history.

(56) References Cited

U.S. PATENT DOCUMENTS

| | | | | |
|---|---|---|---|---|
| 4,392,238 | A * | 7/1983 | Lersmacher et al. | 378/144 |
| 6,430,264 | B1 * | 8/2002 | Lee | 378/144 |
| 2005/0155743 | A1 | 7/2005 | Getz, Jr. et al. | |
| 2011/0129068 | A1 * | 6/2011 | Lewalter et al. | 378/127 |

FOREIGN PATENT DOCUMENTS

| | | |
|---|---|---|
| GB | 1504120 | 8/1975 |
| JP | 10066467 | 3/1998 |

OTHER PUBLICATIONS

U.S. Appl. No. 61/138,167, filed Dec. 2008, Drory, Michael D.*

* cited by examiner

*Primary Examiner* — Irakli Kiknadze

(57) ABSTRACT

The present invention relates to X-ray generating technology in general. Providing an electron collecting element of an X-ray generating device statically may allow for the manufacture of X-ray systems with reduced moving parts and actuating parts, possibly reducing manufacturing costs and sources for failure. Consequently, an electron collecting element with increased thermal loadability is presented. According to the present invention, an electron collecting element (28) is provided, comprising a surface element (22) and a heat conducting element (26). The heat conducting element (26) comprises a first thermal conductivity in a first direction and at least a second thermal conductivity in at least a second direction. The first thermal conductivity is greater than the second thermal conductivity. The first direction is substantially perpendicular to the surface element (22).

15 Claims, 3 Drawing Sheets

ELECTRON COLLECTING ELEMENT WITH INCREASED THERMAL LOADABILITY, X-RAY GENERATING DEVICE AND X-RAY SYSTEM

FIELD OF THE INVENTION

The present invention relates to X-radiation generating technology in general.

More particularly, the present invention relates to an electron collecting element, an X-ray generating device, an X-ray system and the use of an electron collecting element in one of an X-ray generating device, an X-ray system and a CT system. In particular, the present invention relates to an electron collecting element having increased thermal loadability.

BACKGROUND OF THE INVENTION

An X-ray system regularly comprises an X-ray generating device, e.g. an X-ray tube, for generating electromagnetic radiation for acquiring X-ray images in e.g. medical imaging applications, inspection imaging applications or security imaging applications.

An X-ray generating device regularly comprises an electron emitting element, e.g. a cathode element, and an electron collecting element, e.g. an anode element. An electron beam is formed between the electron emitting element and the electron collecting element by accelerating electrons between the electron emitting element and the electron collecting element.

The electron collecting element may generate electromagnetic radiation or X-radiation by electron bombardment. E.g. an electron beam may impinge on an area of the electron collecting element, so constituting a focal spot, on which X-radiation is generated.

An X-ray system may employ a single X-ray source for generating a fan-beam or cone-beam of X-rays, which is rotated about an object, e.g. a patient, for the acquisition of X-ray images.

Thus, in tomographic X-ray imaging systems, a sequence of X-ray projection images or views of a region of interest may be acquired, which images or views may be used to reconstruct a three-dimensional image of e.g. a tissue distribution within a patient. An according image acquisition may be referred to as computed tomography.

Further, a quasi three-dimensional image may be acquired, possibly having a limited resolution in one direction, which may e.g. not require a full revolution of an X-ray generating device about the object to be examined and rather only a part of a revolution, e.g. 40°. An according image acquisition may be referred to as tomosynthesis.

The projection images are taken with different positions of the X-ray focus, i.e. the orientation of the X-ray generating device versus an X-ray detector, which may be achieved by mechanical movement or rotation of the X-ray generating device and the X-ray detector, both possibly located on a gantry, about the object.

A mechanical movement of an X-ray generating device may be considered to be inconvenient, since it may require a bulky and costly gantry and may slow down the overall acquisition time of X-ray images. A reduced acquisition time may be considered to be beneficial, since it may also reduce motion artefacts, e.g. from breathing or by organ movement of e.g. the heart, and may increase patient comfort.

X-ray generating devices for tomographic imaging systems may further employ rotating electron collecting element disks or rotating anode disks rather than stationary electron collecting elements or stationary targets for providing sufficient X-ray generating device power output.

It may thus be beneficial to be able to provide a reduction in mechanical movement of individual parts of an X-ray system, e.g. for reducing acquisition time.

SUMMARY OF THE INVENTION

There may be a need for reducing mechanical movement of both an X-ray collecting element and an X-ray generating device about an object to be examined while maintaining X-ray generating device power output as well as image resolution.

Thus, there may be a need to provide an electron collecting element with increased thermal loadability, in particular a stationary electron collecting element.

In the following, an electron collecting element, an X-ray generating device, an X-ray system and the use of an electron collecting element in one of an X-ray generating device, an X-ray system and a CT system according to the independent claims are provided.

According to an exemplary embodiment of the present invention, an electron collecting element with increased thermal loadability is provided, comprising a surface element and a heat conducting element. The heat conducting element comprises a first thermal conductivity in a first direction and at least a second thermal conductivity in at least a second direction. The first thermal conductivity is greater than the second thermal conductivity and the first direction is substantially perpendicular to the surface element.

According to a further exemplary embodiment of the present invention, an X-ray generating device is provided, comprising an electron emitting element and an electron collecting element according to the present invention. The electron emitting element and the electron collecting element are operatively coupled for generating X-radiation.

According to a further exemplary embodiment of the present invention, an X-ray system is provided, comprising an X-ray generating device according to the present invention and an X-ray detector. An object is arrangeable between the X-ray generating device and the X-ray detector and the X-ray generating device and the X-ray detector are operatively coupled such that an X-ray image of the object is obtainable.

According to a further exemplary embodiment of the present invention, an electron collecting element according to the present invention is used in one of an X-ray system and X-ray generating device and a CT system.

One aspect of the present invention may be seen as employing distributed X-ray sources with multiple X-ray foci distributed in space along a required focus trajectory rather than a single moving X-ray generating device having a single X-ray source.

An according X-ray generating device may contain a plurality of electron emitting elements or electron sources, e.g. cold field emitters, carbon nanotube emitters or thermionic emitters, within a single evacuated envelope accompanied by a stationary electron collecting element. Multiple sources and targets may also be arranged in its own vacuum envelope.

For improving the thermal loadability of a distributed X-ray source comprising a plurality of foci, the present invention proposes a stationary electron collecting element having a high thermal loadability.

Since distributed X-ray sources employ a plurality of foci arranged adjacently or next to each other, a stationary target or a stationary electron collecting element rather than a rotating electron collecting element disk may be employed.

A stationary electron collecting element may comprise an actively cooled metal element, e.g. a metal block with high thermal conductivity, e.g. made of copper as a heat conducting element. A desired target material or surface element may be arranged adjacent to the heat conducting element, e.g. may coat the heat conducting element, employing an element or alloy comprising tungsten or molybdenum.

When electrons of an electron beam hit the surface element or target layer during exposure or generation of X-radiation, the electron collecting element is subjected to a significant thermal load or heat. The heating of the electron collecting element may limit the achievable power of the X-ray generating device.

In case the thermal conductivity of the base material, e.g. copper, of the heat conducting element is greater than the thermal conductivity of the target material, an improved cooling of the electron collecting element may be achievable.

The cooling effect of heat being conducted away from the target material by the base material may be increasing with a decrease in target layer thickness.

The melting point of the base material may be usually lower than the melting point of the target material, thus the thickness of the target layer may not be chosen too small as otherwise the base material may start to melt before the target layer.

Thus, it is desirable to provide an optimum layer thickness of the target material, which may be considered to be determined by and related to the thermal properties of the used materials. In case of the heat conducting element being made of copper, which may be considered to have a melting point rather low compared to the target material made of molybdenum or tungsten, the layer thickness of the target material may be rather large, resulting in a cooling with reduced efficiency, at least at short time intervals.

Accordingly, the present invention proposes the use of a cooling element or heat conducting element made of a composite material, e.g. a carbon fiber carbon matrix composite, possibly having a unidirectional carbon fiber orientation for obtaining a preferred heat conducting direction. Furthermore, fibers made of silicon carbide may be feasible as well.

The fibers may be aligned in particular perpendicular to the target surface, at least locally. In case the target layer may be substantially seen as a plane, the individual fibers are substantially parallel to one another. In case the target layer is a curved or spherical surface, the fibers may e.g. be oriented perpendicular to a local part of the target layer surface from where they may be considered to originate.

Thus, an electron collecting element according to the present invention may comprise a composite material having a unidirectional fiber structure with a high thermal conductivity in the fiber direction. Fibers are aligned, at least locally, perpendicular to the target surface.

Heat may be preferably be conducted along the fibers, thus in the main propagation direction of the fibers of the fiber matrix composite.

A further layer element may be provided between the surface element and the heat conducting element or the target layer and the base material for diffusing, distributing and/or spreading heat occurring of the surface element due to a thermal load. Accordingly, it may be beneficial for the layer element or the diffusion layer or diffusion barrier interlayer to provide an increased thermal conductivity over the target layer, possibly having an omnidirectional heat conducting capability. The diffusion barrier may also prevent formation of tungsten carbide, in case tungsten is employed as target material.

The target layer may comprise an element out of the group of tungsten, molybdenum or rhenium and the diffusion layer may comprise an element out of the group of rhenium, tantalum carbide and niobium.

Both the target layer and the diffusion layer may be adapted to comprise a thickness of only a few μm. E.g. the diffusion layer may comprise a thickness in the range of 1 to 10 μm while the target layer may comprise a thickness in the range of 5 to 100 μm.

In case rhenium is used as a target layer element, the diffusion layer may be omitted, with or without an increase in thickness, e.g. a doubling of the thickness.

The carbon-based composite material may be considered to comprise a high thermal resistivity, e.g. at least 2000° C., while further comprising a high thermal conductivity in fiber direction of about 500 W/mK. Thus, the target layer thickness may be kept substantially thin while achieving increased cooling rates, possibly resulting in a substantial increase of electron collecting element thermal loadability.

The carbon fiber material or the heat conducting element may be cooled, e.g. actively cooled, from below and/or may be mounted on an actively cooled copper block or a further material with preferred isotropic heat conduction capability. The carbon fibers may have a preferred thickness in the order of magnitude of the focal spot size, in particular its linear extension, like e.g. <1 mm, 1 mm or even 2 mm to 10 mm.

The diffusion layer and/or the target layer may be applied to the base material or the heat conducting element by coating technologies like physical vapor deposition (PVD), chemical vapor deposition (CVD) or a thermal spraying process.

In the following, further embodiments of the present invention are described referring in particular to an electron collecting element, an X-ray generating device and an X-ray system respectively. However, it is to be understood that these explanations apply to all embodiments of the electron collecting element, the X-ray generating device, the X-ray system and the use of an electron collecting element in one of an X-ray generating device, X-ray system and a CT system.

It is noted that arbitrary variations and interchanges of single or multiple features between claims and in particular between claimed entities are conceivable and within the scope and disclosure of the present patent application.

According to a further exemplary embodiment of the present invention, the heat conducting element is a composite element.

A composite element may allow to specifically build or tailor the heat conducting element, in particular the physical dimensions and physical attributes of the heat conducting element, to the desired application.

According to a further exemplary embodiment of the present invention, the heat conducting element may comprise a unidirectional fiber structure.

Having a fiber structure, in particular a unidirectional fiber structure, may allow for a preferred heat conduction in the direction of the fiber structure.

According to a further exemplary embodiment of the present invention, the unidirectional fiber structure may be substantially parallel to the first direction. Thus, the fiber structure may be substantially perpendicular, at least locally, to the surface element.

Having a unidirectional fiber structure perpendicular to the surface element may allow a preferred heat conduction of heat away from the surface element into the volume or depth of the heat conducting element via the fiber structure.

According to a further exemplary embodiment of the present invention, the heat conducting element may comprise a unidirectional thermal conductivity.

In the context of the present patent application a unidirectional thermal conductivity may in particular be understood as a thermal conductivity, which is significantly increased in a direction versus a further direction in which the heat conducting element comprises a further thermal conductivity lower than the thermal conductivity in the first direction. Accordingly, a directed conduction of thermal energy within a volume may be achievable.

According to a further exemplary embodiment of the present invention, the heat conducting element may comprise a carbon fiber carbon matrix composite structure.

Employing a carbon fiber material and/or a carbon matrix material may provide a preferred thermal conductivity.

According to a further exemplary embodiment of the present invention, the surface element may be adapted as a target surface layer element comprising a material out of the group consisting of molybdenum, tungsten and rhenium.

Employing an according material may allow a preferred generation of X-radiation by electron bombardment of the surface element of the electron collecting element.

According to a further exemplary embodiment of the present invention, the electron collecting element may further comprise a layer element, wherein the layer element is arranged between the surface element and the heat conducting element and wherein the layer element comprises a material out of the group consisting of rhenium (Re), niobium (Nb), tantalum carbide (TaC), titanium carbide (TiC), hafnium carbide (HfC), titanium nitride (TiN), titanium carbonitride (TiCN), molybdenum carbide (MoC) and a multilayer arrangement comprising renium (Re) and one of the before mentioned materials.

An according layer element, in particular made of an according material, may allow a preferred distribution or spread of thermal energy between a possibly small focal spot on the surface element, spreading or distributing generated heat over an increased area of the heat conducting element and its individual fibers respectively. An according layer element may provide in particular beneficial in case the thermal conductivity in fiber direction, thus perpendicular to the surface element is substantially higher than the thermal conductivity of the heat conducting element in a further direction, e.g. parallel to the surface element. Accordingly, the layer element may be adapted as a heat distributing element.

According to a further exemplary embodiment of the present invention, the electron collecting element may be adapted as a distributed X-ray source.

An according electron collecting element may provide X-radiation emanating from a plurality of individual angles, thus without the need for moving a single dedicated X-ray source.

According to a further exemplary embodiment of the present invention, the electron collecting element may be adapted as a stationary electron collecting element.

Employing a stationary electron collecting element, a dedicated drive for a possible high speed turning of a rotating disk element may not be required, thus reducing manufacturing costs of an X-ray generating device.

According to a further exemplary embodiment of the present invention, the X-ray system may be adapted as a stationary, non-rotating and/or non-fully rotating X-ray system.

An according X-ray system may not require to provide a gantry for rotating an X-ray generating device and an X-ray detector about an object to be examined. At least no full rotation may be required, e.g. only a minor rotation of e.g. 40° may be conceivable.

These and other aspects of the present invention will become apparent from and elucidated with reference to the embodiments described hereinafter.

Exemplary embodiments of the present invention will be described below with reference to the following drawings.

The illustration in the drawings is schematic.

In different drawings, similar or identical elements are provided with similar or identical reference numerals.

Figures are not drawn to scale, however may depict qualitative proportions.

DETAILED DESCRIPTION OF EMBODIMENTS

Figure 1:
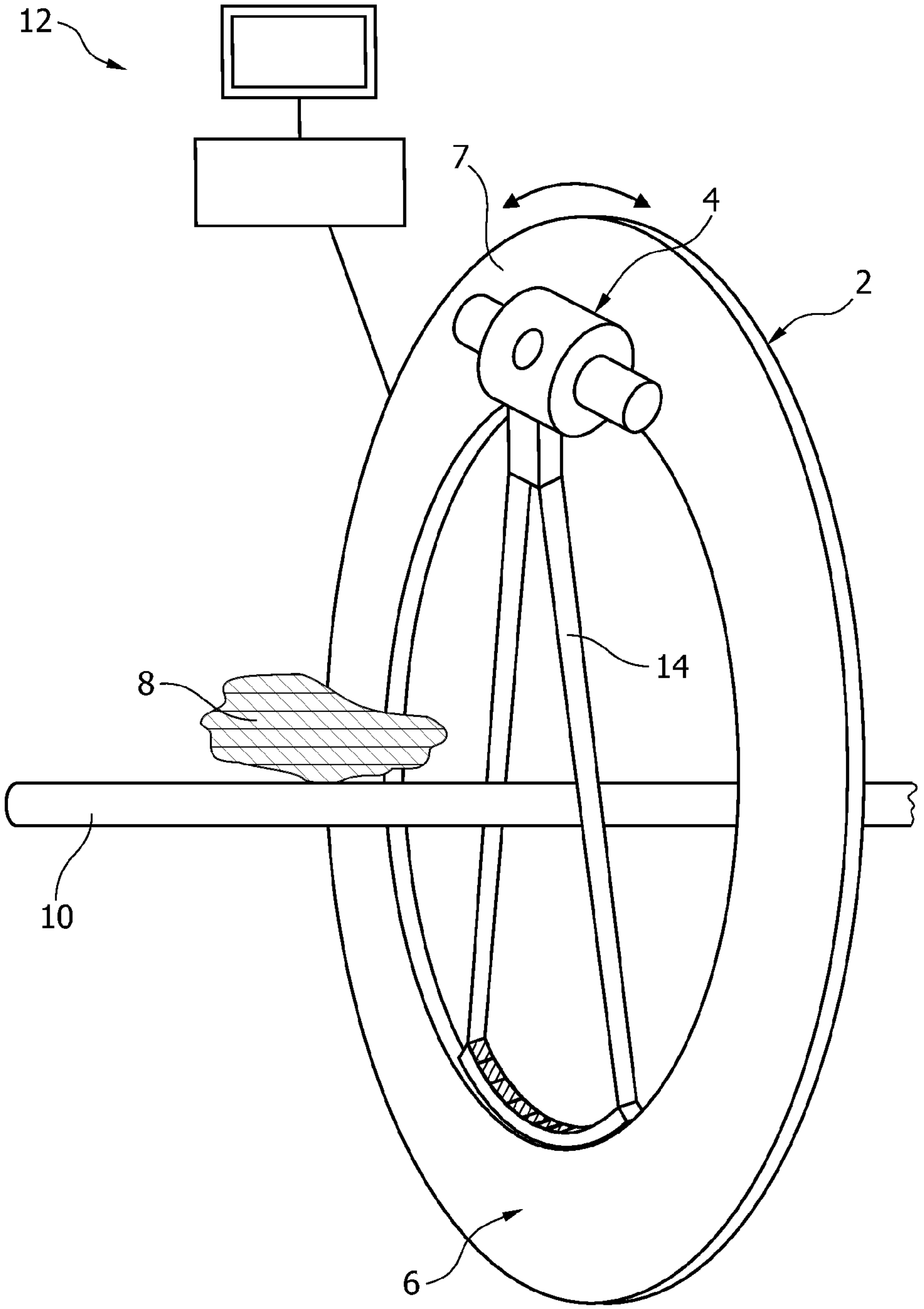
FIG. 1 shows an exemplary embodiment of an X-ray system.

Now referring to FIG. 1, an exemplary embodiment of an X-ray system is depicted.

In FIG. 1, an X-ray system 2 comprising an X-ray generating device 4 as well as an X-ray detector 6 is depicted.

Both the X-ray generating device and the X-ray detector 6 are arranged on a gantry 7. The gantry 7 is adapted for rotation about an object 8 situated in the path of X-radiation 14 on a support 10. X-ray detector 6 is exemplary embodied as a line array shaped detector arrangement. Computer system 12 is connected to X-ray system 2 for controlling acquisition parameters as well as evaluating acquired information by the X-ray detector 6 for reconstruction of e.g. volumetric image information of the object 8.

X-ray system 2 in FIG. 1 may be seen as being embodied as a single X-ray source of the X-ray generating device 4, which is required to move, at least sectionally, about object 8 on gantry 7 for acquisition of X-ray images.

Figure 2B:
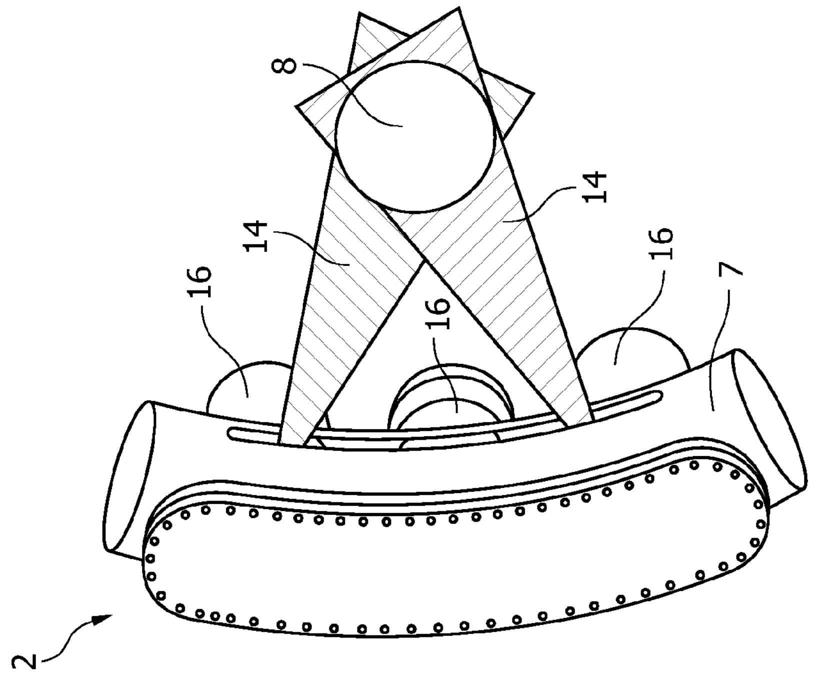
FIGS. 2_a,b_ show an exemplary embodiment of an X-ray system with a distributed X-ray source according to the present invention.
Figure 2A:
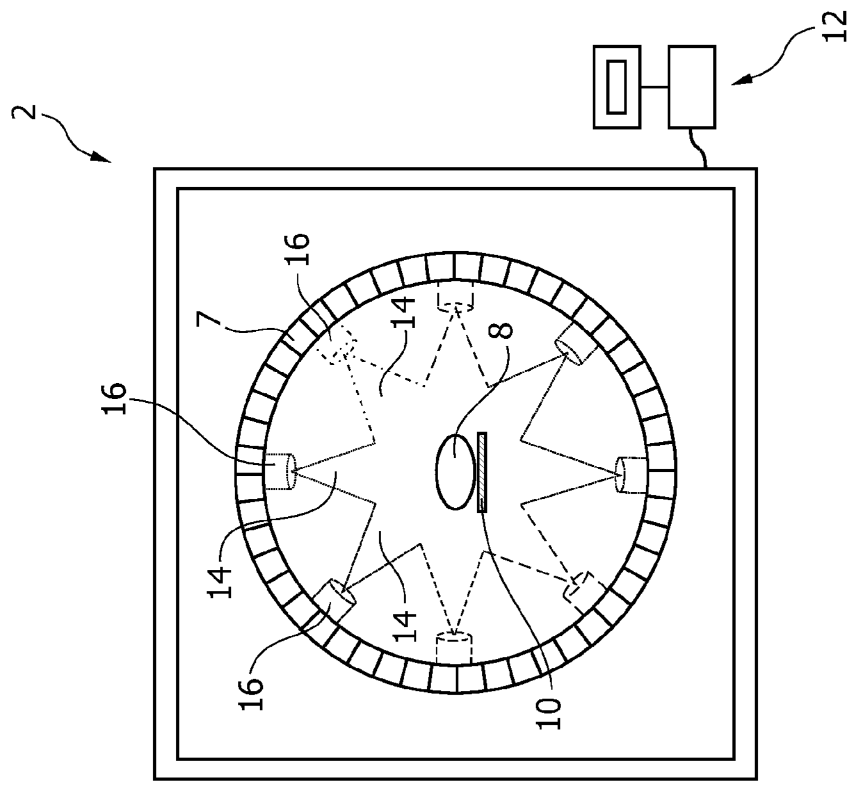

Now referring to FIGS. 2_a,b_, an exemplary embodiment of an X-ray system with a distributed X-ray source according to the present invention is depicted.

In FIG. 2_a_, X-ray system 2 comprises exemplary eight distributed X-ray sources 16, each X-ray source 16 generating an individual X-ray beam 14, possibly arranged as a cone-shaped beam or fan-shaped beam. On support 10, object 8 is arranged in the center of gantry 7, which in case of FIG. 2_a_ may not be adapted to be rotatable, at least not fully rotatable. Thus, gantry 7 in FIG. 2_a_ may be considered as a mechanical support for carrying or mounting individual distributed X-ray sources 16.

X-radiation 14 of each distributed X-ray source 16 may be seen as penetrating object 8, possibly being attenuated spatially by the inner tissue distribution of object 8, subsequently arriving at an X-ray detector element 6, not depicted in FIG. 2_a_. Attenuated X-radiation arriving at X-ray detector elements 6 is converted by X-ray detector 6 into electrical signals, which may be provided to computer system 12 for reconstruction and display of three-dimensional image data.

Now referring to FIG. 2_b_, a sectional cut-out of gantry 7 of FIG. 2_a_ is depicted schematically. Exemplary three distributed X-ray sources 16 are arranged at the cutout of gantry 7.

Object 8 is arranged such that X-radiation 14, generated by the distributed X-ray sources 16, may penetrate object 8, thus being attenuated spatially before arriving at a detector element 6, not depicted in FIG. 2_b_. Distributed X-ray sources 16 are arranged in the inside of the possibly hollow gantry 7 with X-radiation 14 leaving the inside of the distributed X-ray sources 16 and gantry 7 respectively by a slot. The slot may further comprise collimation elements for generating a fan-shaped form or a cone-shaped form of X-ray beam 14.

Figure 3:
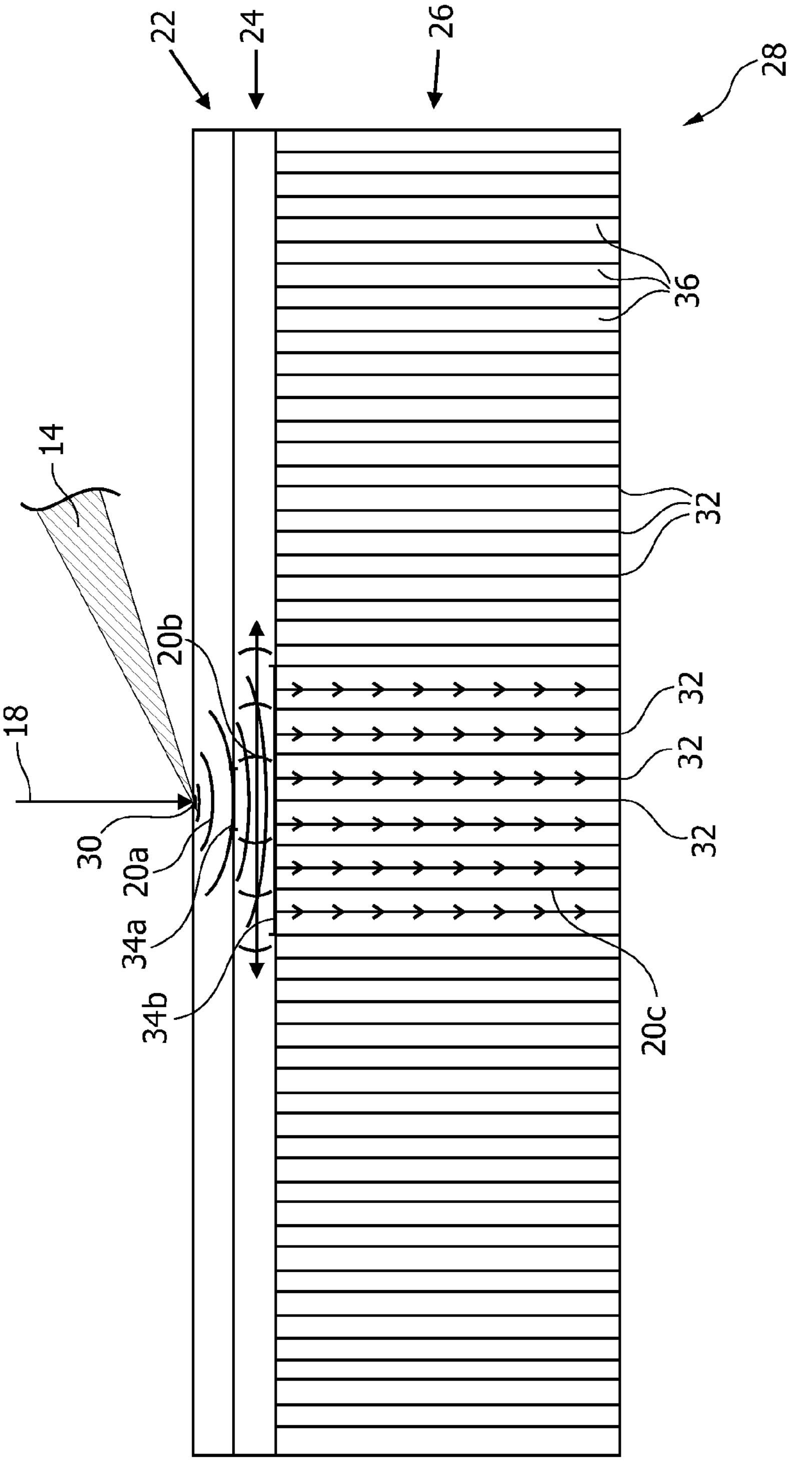
FIG. 3 shows an exemplary embodiment of an electron collecting element according to the present invention.

Now referring to FIG. 3, an exemplary embodiment of an electron collecting element according to the present invention is depicted.

Electron collecting element 28 exemplary comprises both a surface element 22 as well as a layer element 24 or diffusion element 24 arranged adjacently and covering heat conducting element 26.

Electrons of electron beam 18 are impinging on surface element 22 in the area of focal spot 30. By impingement of the electron beam 18 on focal spot 30, X-radiation 14 is generated, depicted only schematically in FIG. 3.

Surface element 22, in the area of focal spot 30, is subjected to a thermal load by impingement of electron beam 18 with subsequent generation of X-radiation 14. Heat propagation 20*a* occurs in surface element 22, possibly spreading or enlarging in size with an increase in penetration depth.

Furthermore, layer element 24 is additionally providing heat propagation or distribution 20*b*, thus further enlarging the area subjected to an increase in heat or a thermal load, which subsequently is in thermally conductive contact with heat conducting element 26.

Thus, an increase in size of an area subjected to an increase in heat is enlarged starting from focal spot 30 to a first area 34*a* between surface element 22 and layer element 24, with a further increase to area 34*b* between the layer element 24 and the heat conducting element 26.

Heat conducting element 26 comprises a composite structure comprising fiber elements 32 as well as matrix material 36. Both the fiber elements 32 and the matrix material 36 may be carbon-based.

Fiber elements 32 are arranged parallel to one another in FIG. 4 and in particular perpendicular to both the surface element 22 and the layer element 24. The fiber structure comprising fiber elements 32 may thus be seen as providing a heat conductivity along the individual elements 32 into the depth of the heat conducting element 26. Consequently, a thermal load provided to the heat conducting element 26 via area 34*b* is primarily directed into the depth or volume of heat conducting element 26, thus being conducted away from surface element 22 and layer element 24 by heat transfer 20*c*.

Accordingly, a thermal load provided by electron beam 18 to surface element 22 is distributed by surface element 22, layer element 24 as well as heat conducting element 26 away from focal spot 30. Heat conducting element 26 has a preferred direction of thermal conductivity along fiber elements 32 with a reduced or neglectable further heat transfer capability, e.g. parallel to surface element 22.

The layer element or diffusion element 24 may also not be provided but rather surface element 22 may be arranged directly adjacent to heat conducting element 26. In particular, the thermal resistivity or melting temperature of surface element 22, layer element 24 and/or heat conducting element 26 may be substantially similar, so that a dedicated melting of one element, e.g. the heat conducting element may be prohibited.

E.g. an arrangement of the layer element having a melting point of about 2.400-3.000° C. and the heat conducting element having a thermal resistivity of about 2.000° C. may be seen as being arranged substantially similar.

Heat conductive element may thus be seen as being adapted for conducting heat or a thermal load away from one of the surface element 22 and the layer element 24.

Layer element 24 may be adapted to provide sufficient adhesion for surface element 22 and to provide a barrier for carbon diffusion from heat conducting element 26 to surface element 22, e.g. in case surface element 22 is a carbide forming metal like tungsten. The layer element 24 may also be formed as a multilayer stack of several materials, e.g. to generate a match of thermal expansion coefficients between heat conducting element 26 and surface element 22.

It should be noted that the term "comprising" does not exclude other elements or steps and that "a" or "an" does not exclude a plurality. Also, elements described in association with different embodiments may be combined.

It should also be noted, that reference numerals in the claims shall not be construed as limiting the scope of the claims.

REFERENCE NUMERALS

2 X-ray system
4 X-ray generating device
6 X-ray detector
7 Gantry
8 Object
10 Support
12 Computer system
14 X-radiation
16 Distributed X-ray source
18 Electron beam
20*a,b,c* Heat transfer/heat propagation/heat distribution
22 Surface element
24 Layer element/diffusion element
26 Heat conducting element
28 Electron collecting element
30 Focal spot
32 Fiber element
34*a,b* Area
36 Matrix material

The invention claimed is:

1. Electron collecting element with increased thermal loadability, comprising:
a surface element; and
a heat conducting element;
wherein the surface element and the heat conducting element are adjoiningly arranged;
wherein the heat conducting element comprises a first thermal conductivity in a first direction;
wherein the heat conducting element comprises a second thermal conductivity in a second direction;
wherein the first thermal conductivity is greater than the second thermal conductivity; and
wherein the first direction is perpendicular to the surface element, further wherein the heat conducting element comprises a unidirectional fiber structure having individual fibers, parallel to one another, in a unidirectional fiber orientation, the fibers further being parallel to the first direction.

2. Electron collecting element according to claim 1, wherein the heat conducting element is a composite element.

3. Electron collecting element according to claim 1, wherein the heat conducting element comprises a unidirectional thermal conductivity.

4. Electron collecting element according to claim 1, wherein the heat conducting element comprises a carbon fiber carbon matrix composite structure.

5. Electron collecting element according to claim 1, wherein the surface element is adapted as a target surface layer element comprising a material out of the group consisting of molybdenum (Mo), tungsten (W) and rhenium (Re).

6. Electron collecting element according to claim 1, further comprising:

a layer element;

wherein the layer element is arranged between the surface element and the heat conducting element; and wherein the layer element comprises a material out of the group consisting of rhenium (Re), niobium (Nb) and tantalum carbide (TaC), titanium carbide (TiC), hafnium carbide (HfC), titanium nitride (TiN), titanium carbonitride (TiCN), molybdenum carbide (MoC) and a multilayer arrangement further comprising renium (Re).

7. Electron collecting element according to claim 6, wherein the layer element is adapted as a heat distributing element.

8. X-ray generating device, comprising:

an electron emitting element; and an electron collecting element according to claim 1;

wherein the electron emitting element and the electron collecting element are operatively coupled for generating X-radiation.

9. X-ray generating device according to claim 8, wherein the electron collecting element is adapted as a distributed X-ray source.

10. X-ray system, comprising:

an X-ray generating device according to claim 8; and an X-ray detector;

wherein an object is arrangeable between the X-ray generating device and the X-ray detector; and wherein the X-ray generating device and the X-ray detector are operatively coupled such that an X-ray image of the object is obtainable.

11. X-ray system according to claim 10, wherein the X-ray system is adapted as a stationary, non-rotating and/or non-fully-rotating X-ray system.

12. Use of an electron collecting element according to claim 1 in one of an X-ray generating device, an X-ray system and a CT system.

13. X-ray generating device according to claim 8, wherein the electron collecting element is adapted as a stationary electron collecting element.

14. X-ray generating device comprising:

an electron emitting element; and an electron collecting element with increased thermal loadability, wherein the electron collecting element comprises a surface element and a heat conducting element, wherein the surface element and the heat conducting element are adjoiningly arranged, wherein the heat conducting element comprises a first thermal conductivity in a first direction, wherein the heat conducting element comprises at least a second thermal conductivity in at least a second direction, wherein the first thermal conductivity is greater than the second thermal conductivity, and wherein the first direction is substantially perpendicular to the surface element, wherein the electron emitting element and the electron collecting element are operatively coupled for generating X-radiation, wherein the electron collecting element is adapted as a stationary electron collecting element.

15. X-ray system comprising:

an X-ray generating device, wherein the X-ray generating device comprises (i) an electron emitting element and (ii) an electron collecting element with increased thermal loadability, wherein the electron collecting element comprises a surface element and a heat conducting element, wherein the surface element and the heat conducting element are adjoiningly arranged, wherein the heat conducting element comprises a first thermal conductivity in a first direction, wherein the heat conducting element comprises at least a second thermal conductivity in at least a second direction, wherein the first thermal conductivity is greater than the second thermal conductivity, and wherein the first direction is substantially perpendicular to the surface element, wherein the electron emitting element and the electron collecting element are operatively coupled for generating X-radiation; and an X-ray detector;

wherein an object is arrangeable between the X-ray generating device and the X-ray detector, and wherein the X-ray generating device and the X-ray detector are operatively coupled such that an X-ray image of the object (8) is obtainable, wherein the X-ray system is adapted as a stationary, non-rotating and/or non-fully-rotating X-ray system.

* * * * *